(12) United States Patent
DeLapp et al.

(10) Patent No.: US 11,852,816 B1
(45) Date of Patent: Dec. 26, 2023

(54) OPTICAL SYSTEMS WITH RESOLUTION-ENHANCING SPECTRAL SHIFTING

(71) Applicant: Apple Inc., Cupertino, CA (US)

(72) Inventors: Scott M. DeLapp, San Diego, CA (US); Guolin Peng, Sunnyvale, CA (US); Hyungryul Choi, San Jose, CA (US); Vikrant Bhakta, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 17/373,210

(22) Filed: Jul. 12, 2021

Related U.S. Application Data

(60) Provisional application No. 63/051,330, filed on Jul. 13, 2020.

(51) Int. Cl.
*G02B 27/01* (2006.01)
*G02B 6/34* (2006.01)
*F21V 8/00* (2006.01)

(52) U.S. Cl.
CPC ....... G02B 27/0172 (2013.01); G02B 6/0016 (2013.01); G02B 6/0026 (2013.01);
(Continued)

(58) Field of Classification Search
CPC .............. G02B 27/017; G02B 27/0172; G02B 2027/0174; G02B 27/0176; G02B 2027/0178; G02B 27/0179; G02B 2027/0134; G02B 2027/0136; G02B 2027/0138; G02B 2027/014; G02B 5/0252; G02B 5/1828; G02B 5/203; G02B 6/29304; G02B 6/2931; G02B 6/29311; G02B 6/29316; G02B 6/29322; G02B 6/29323; G02B 6/29328; G02B 6/29329; G02B 6/3516; G02B 6/3534; G02B 26/106; G02B 26/108; G02B 27/0031; G02B 27/0037; G02B 27/0056; G02B 27/0944; G02B 6/0016; G02B 6/0018;
(Continued)

(56) References Cited

U.S. PATENT DOCUMENTS 10,866,426 B2  12/2020  Hansotte et al.
11,009,707 B2  5/2021   Peng et al.
(Continued)

*Primary Examiner* — Hoan C Nguyen
(74) *Attorney, Agent, or Firm* — Treyz Law Group, P.C.; Michael H. Lyons

(57) ABSTRACT

The display may include a display module and a waveguide. The module may produce first light of first wavelengths during first time periods and may produce second light of second wavelengths during second time periods interleaved with the first time periods. Diffractive gratings or a dichroic wedge may redirect the first light into the waveguide at a first angle and may redirect the second light into the waveguide at a second angle separated from the first angle by a separation angle. The separation angle may be equal to half the angle subtended by the projection of a pixel in the module. The first and second time periods may alternate faster than the response of the human eye. This may configure the first and second image light to collectively provide images at an eye box with an increased effective resolution without increasing the space or power consumed by the display module.

23 Claims, 8 Drawing Sheets

(52) U.S. Cl.
CPC ............. *G02B 6/0031* (2013.01); *G02B 6/34* (2013.01); *G02B 2027/0147* (2013.01); *G02B 2027/0174* (2013.01); *G02B 2027/0178* (2013.01)

(58) Field of Classification Search
CPC ...... G02B 6/0031; G02B 6/0033; G02B 6/34; G02B 2027/0147; G02B 6/0076; G02B 6/0056; G02B 2027/0125; G02B 27/283; G02B 27/286; G02B 2027/0123; G02B 27/0081; G02B 27/4261; G02B 6/0038; G02F 1/292
See application file for complete search history.

(56) References Cited

U.S. PATENT DOCUMENTS

| | | | |
|---|---|---|---|
| 2015/0015855 A1* | 1/2015 | Wang | G02B 30/33 |
| | | | 353/121 |
| 2017/0276953 A1* | 9/2017 | Huang | G02B 3/005 |
| 2020/0004020 A1 | 1/2020 | Bhakta et al. | |
| 2020/0012093 A1* | 1/2020 | Marshall | G02B 27/0081 |
| 2021/0018674 A1* | 1/2021 | Tan | G02F 1/134309 |
| 2021/0199970 A1* | 7/2021 | Huang | G02B 27/0172 |
| 2022/0091323 A1* | 3/2022 | Yaroshchuk | G02B 27/4227 |
| 2022/0206295 A1* | 6/2022 | Calafiore | G02B 5/1828 |

* cited by examiner

OPTICAL SYSTEMS WITH RESOLUTION-ENHANCING SPECTRAL SHIFTING

This application claims the benefit of U.S. Provisional Patent Application No. 63/051,330, filed Jul. 13, 2020, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays. In general, there is a demand for displays to provide images with as high an image resolution as possible.

However, it can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The near-eye display may provide images to an eye box. The display may include a display module and a waveguide. The display module may include first light sources that produce first illumination light of a first set of wavelengths. The display module may include second light sources that produce second illumination light of a second set of wavelengths that is offset from the first set of wavelengths (e.g., by 20 nm or less). The display module may include a reflective display panel that reflects the first illumination light to produce first image light and that reflects the second illumination light to produce second image light. The first light sources may be turned on during first time periods and the second light sources may be turned on during second time periods that are interleaved with the first time periods.

The display may include wavelength-separating input coupling structures. The first and second image light may be aligned and may be provided to a common locus at the wavelength-separating input coupling structures (e.g., at the same incident angle and location during the first and second time periods). The wavelength-separating input coupling structures may redirect the first image light into the waveguide at a first angle. The wavelength-separating input coupling structures may redirect the second image light into the waveguide at a second angle that is separated from the first angle by a non-zero separation angle. The wavelength-separating input coupling structures may include one or more transmissive diffraction gratings, one or more reflective diffraction gratings, or a dichroic wedge.

The waveguide may propagate the first and second image light via total internal reflection. An output coupler may couple the first and second image light out of the waveguide and towards the eye box. The reflective display panel may include pixels. The separation angle between the first and second image light may be equal to one-half of the angle subtended by the projection of one of the pixels. The first and second time periods may alternate faster than the response time of the human eye. This may configure the first and second image light to collectively provide images with an increased effective resolution at the eye box, without increasing the space or power consumed by the display module.

DETAILED DESCRIPTION

Figure 1:
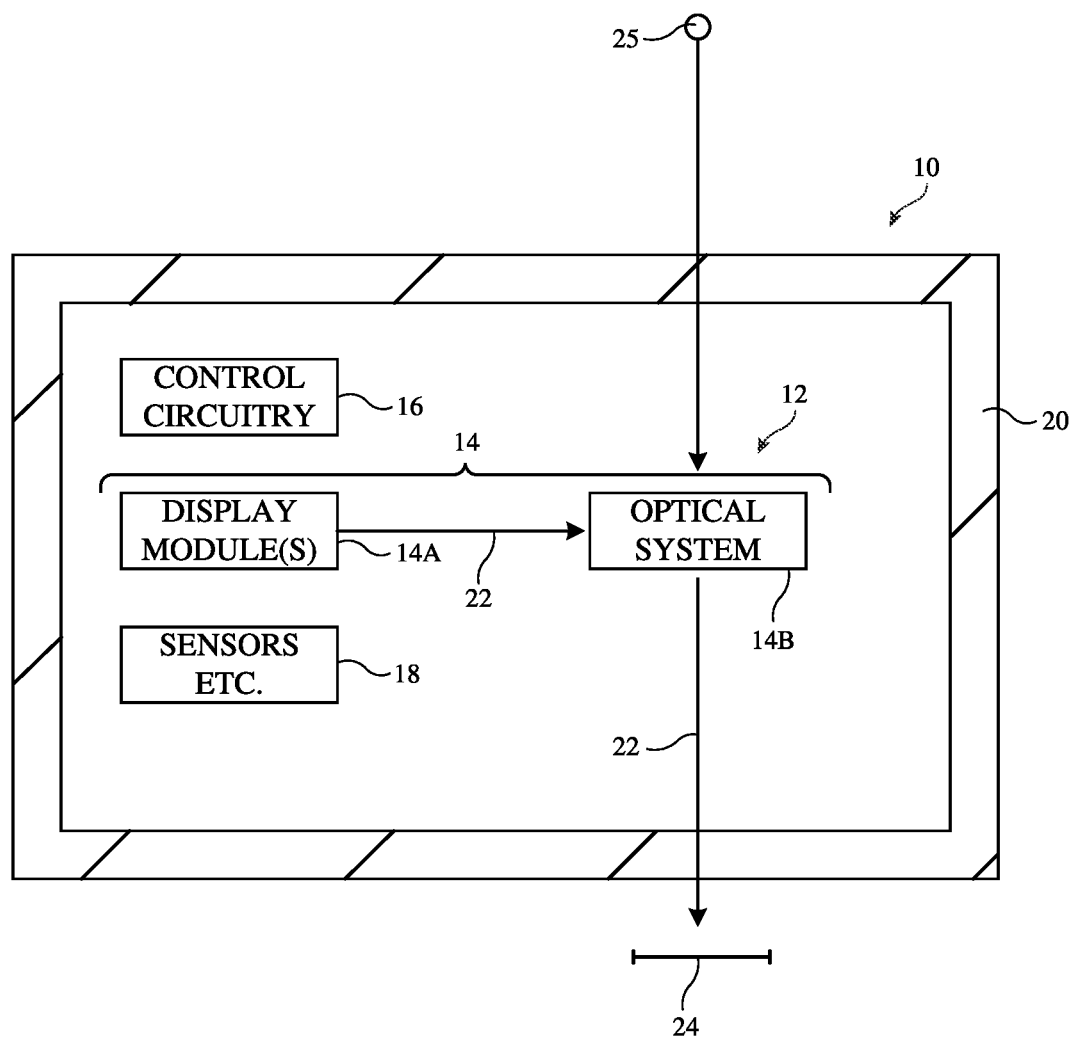
FIG. 1 is a diagram of an illustrative system having a display in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B.

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). In one suitable arrangement that is sometimes described herein as an example, components 18 may include gaze tracking sensors that gather gaze image data from a user's eye at eye box 24 to track the direction of the user's gaze in real time.

Display modules 14A (sometimes referred to herein as display engines 14A, light engines 14A, or projectors 14A) may include reflective displays (e.g., displays having arrays of light sources that produce illumination light that reflect off of a reflective display panel to produce image light such as liquid crystal on silicon (LCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
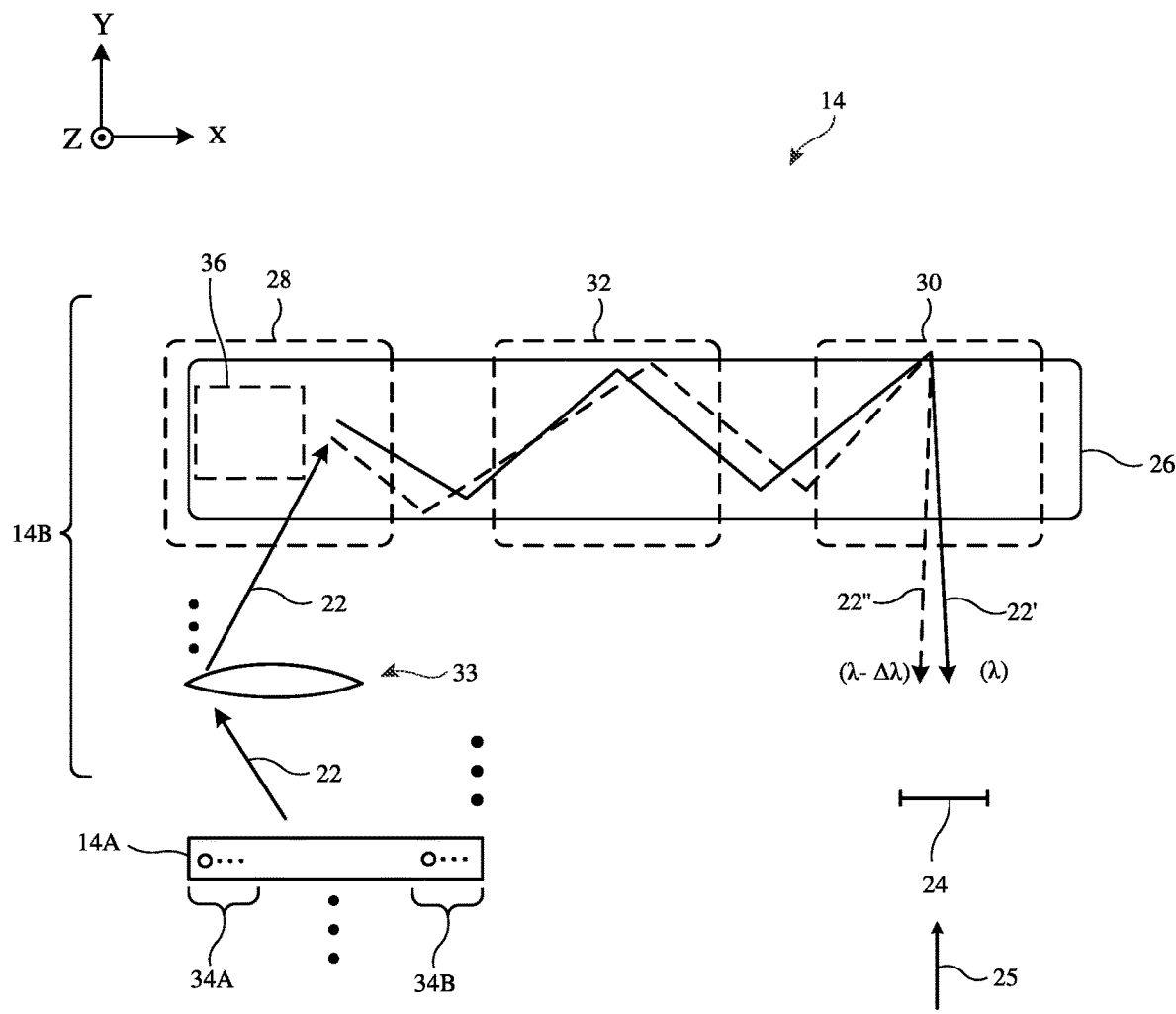
FIG. 2 is a top view of an illustrative optical system having a waveguide with wavelength-separating input coupling structures for maximizing image resolution at an eye box in accordance with some embodiments.

FIG. 2 is a top view of an illustrative display 14 that may be used in system 10 of FIG. 1. As shown in FIG. 2, near-eye display 14 may include one or more display modules such as display module(s) 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

If desired, waveguide 26 may also include one or more layers of holographic recording media (sometimes referred to herein as holographic media, grating media, or diffraction grating media) on which one or more diffractive gratings are recorded (e.g., holographic phase gratings, sometimes referred to herein as holograms). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating media may include photopolymers, gelatin such as dichromated gelatin, silver halides, holographic polymer dispersed liquid crystal, or other suitable holographic media.

Diffractive gratings on waveguide 26 may include holographic phase gratings such as volume holograms or thin-film holograms, meta-gratings, or any other desired diffractive grating structures. The diffractive gratings on waveguide 26 may also include surface relief gratings formed on one or more surfaces of the substrates in waveguides 26, gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles).

Optical system 14B may include collimating optics such as collimating lens 33. Collimating lens 33 may include one or more lens elements that help direct image light 22 towards waveguide 26. Collimating lens 33 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module(s) 14A may generate image light 22 associated with image content to be displayed to eye box 24. Image light 22 may be collimated using a lens such as collimating lens 33. Optical system 14B may be used to present the image light output from display module(s) 14A to eye box 24.

Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc.

The example of FIG. 2 is merely illustrative. One or more of these couplers (e.g., cross-coupler 32) may be omitted. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Waveguide 26 may guide the image light down its length via total internal reflection. Input coupler 28 may be configured to couple the image light 22 from display module(s) 14A into waveguide 26, whereas output coupler 30 may be configured to couple the image light from within waveguide 26 to the exterior of waveguide 26 and towards eye box 24. Input coupler 28 may include an input coupling prism in one suitable arrangement. As an example, display module(s) 14A may emit image light 22 in the +Y direction towards optical system 14B. When image light 22 strikes input coupler 28, input coupler 28 may redirect the image light so that the light propagates within waveguide 26 via total internal reflection towards output coupler 30 (e.g., in the +X direction). When the image light strikes output coupler 30, output coupler 30 may redirect the image light out of waveguide 26 towards eye box 24 (e.g., in the −Y direction). In scenarios where cross-coupler 32 is formed at waveguide 26, cross-coupler 32 may redirect the image light in one or more directions as it propagates down the length of waveguide 26, for example.

Input coupler 28, cross-coupler 32, and/or output coupler 30 may be based on reflective and refractive optics or may be based on holographic (e.g., diffractive) optics. In arrangements where couplers 28, 30, and 32 are formed from reflective and refractive optics, couplers 28, 30, and 32 may include one or more reflectors (e.g., an array of micromirrors, partial mirrors, louvered mirrors, or other reflectors). In arrangements where couplers 28, 30, and 32 are based on holographic optics, couplers 28, 30, and 32 may include diffractive gratings (e.g., volume holograms, surface relief gratings, etc.).

In one suitable arrangement that is sometimes described herein as an example, output coupler 30 is formed from diffractive gratings or micromirrors embedded within waveguide 26 (e.g., volume holograms recorded on a grating medium stacked between transparent polymer waveguide substrates, an array of micromirrors embedded in a polymer layer interposed between transparent polymer waveguide substrates, etc.). If desired, input coupler 28 may include a prism mounted to an exterior surface of waveguide 26 (e.g., an exterior surface defined by a waveguide substrate that contacts the grating medium or the polymer layer used to form output coupler 30).

It may be desirable to display high resolution images at eye box 24. In general, increasing the size and power consumption of display module 14A may allow images to be displayed at eye box 24 with higher resolutions. However, it may be desirable for display module 14A to be as compact and to consume as little power as possible. In order to increase the effective resolution of the images provided to eye box 24 without significantly increasing the size or power consumption of display module 14A, display module 14A may include first and second sets of light sources 34A and 34B and input coupler 28 may include wavelength-separating input coupling structures 36.

The first set of light sources 34A (sometimes referred to herein as first light sources 34A) may be used to produce image light 22 at a first set of wavelengths $\lambda$ (e.g., within a first set of color bands such as red, green, and blue color bands). The second set of light sources 34B (sometimes referred to herein as second light sources 34B) may be used to produce image light 22 at a second set of wavelengths $\lambda - \Delta\lambda$ that are separated in wavelength from the first set of wavelengths $\lambda$ produced by light sources 34A by a wavelength offset $\Delta\lambda$. For example, second light sources 34B may be used to produce image light 22 within a second set of color bands such as a red color band that is shifted by wavelength offset $\Delta\lambda$ relative to the red color band produced by first light sources 34A, a green color band that is shifted by wavelength offset $\Delta\lambda$ relative to the green color band produced by first light sources 34A, and a blue color band that is shifted by wavelength offset $\Delta\lambda$ relative to the blue color band produced by first light sources 34A. The same wavelength offset $\Delta\lambda$ may be used for each color band or different offsets may be used for different color bands if desired. As examples, wavelength offset $\Delta\lambda$ may be approximately 10 nm, 5 nm, 1 nm, 20 nm, 25 nm, 30 nm, 1-10 nm, 5-20 nm, 10-30 nm, 1-30 nm, 5-15 nm, less than 50 nm, greater than 1 nm, greater than 10 nm, or any other desired value. Light sources 34A and 34B may include uLEDs, OLEDs, LEDs, lasers, combinations of these, or any other desired light-emitting components.

Control circuitry 16 (FIG. 1) may control display module 14A to rapidly alternate between using first light sources 34A and second light sources 34B to produce image light 22 over time. Display module 14A may alternate between first light sources 34A and 34B at a rate faster than the response rate of the human eye, for example. When first light sources 34A are on/active (e.g., while second light sources 34B are off/inactive), image light 22 is produced by first light sources 34A and is provided to input coupler 28 at the first set of wavelengths $\lambda$. When second light sources 34B are on/active (e.g., while first light sources 34A are off/inactive), image light 22 is produced by second light sources 34B and is provided to input coupler 28 at the second set of wavelengths λ-Δλ.

Wavelength-separating input coupling structures 36 (sometimes referred to herein as wavelength-splitting input coupling structures 36) may be formed on a lateral surface of waveguide 26, may be formed on a surface of an input coupling prism in input coupler 28, or may be embedded within waveguide 26. Wavelength-separating input coupling structures 36 may serve to separate incident image light 22 by color (wavelength) prior to the image light propagating down the length of waveguide 26 via total internal reflection. For example, wavelength-separating input coupling structures 36 may receive image light 22 at the same incident angle regardless of whether the image light 22 is provided at the first set of wavelengths λ or at the second set of wavelengths λ-Δλ. Wavelength-separating input coupling structures 36 may redirect the image light 22 at the first set of wavelengths λ in a first direction (e.g., onto a first output angle or range of output angles), as image light 22'. Image light 22', which is at the first set of wavelengths λ, may propagate down the length of waveguide 26 via total internal reflection. Cross coupler 32 may optionally redirect image light 22'. Output coupler 30 may couple image light 22' out of waveguide 26 and towards eye box 24. Similarly, wavelength-separating input coupling structures 36 may redirect the image light 22 at the second set of wavelengths λ-Δλ in a second direction (e.g., onto a second output angle or range of output angles), as image light 22". Image light 22", which is at the second set of wavelengths λ-Δλ, may propagate down the length of waveguide 26 via total internal reflection. Cross coupler 32 may optionally redirect image light 22". Output coupler 30 may couple image light 22" out of waveguide 26 and towards eye box 24.

Wavelength-separating input coupling structures 36 may output image light 22' and image light 22" prior to the image light being coupled into waveguide 26 or wavelength-separating input coupling structures 36 may also serve to couple image light 22' and image light 22" into waveguide 26. Wavelength-separating input coupling structures 36 may output image light 22" at an angular offset (sometimes referred to herein as a separation angle) with respect to the image light 22' output by wavelength-separating input coupling structures 36. Image light 22' may also be angularly offset from image light 22" (e.g., by the separation angle) at eye box 24. Image light 22' and image light 22" may both be used to convey the same frames of image data (e.g., frames from a stream of video data). The separation angle may, for example, be one-half the angle subtended by the projection of one pixel of display module 14A (e.g., by one pixel of the frames of image data). Wavelength offset Δλ may be sufficiently small so as to allow image light 22' and image light 22" to appear to the user to be the same or approximately the same color (e.g., less than 50 nm, less than 30 nm, less than 20 nm, less than 10 nm, etc.). By rapidly toggling between production of image light 22 by first light sources 34A (e.g., at the first set of wavelengths λ) and production of image light 22 by second light sources 34B (e.g., at the second set of wavelengths λ-Δλ), the combination of image light 22" and image light 22' at eye box 24 may cause the image frames to appear at eye box 24 with an effective resolution that is greater than (e.g., twice) the resolution the image frames would have in scenarios where second light sources 34B and wavelength-separating input coupling structures 36 are omitted. In other words, display 14 of FIG. 2 may produce images at eye box 24 that have an increased effective resolution without significantly increasing the size or power consumption within display 14.

Figure 3:
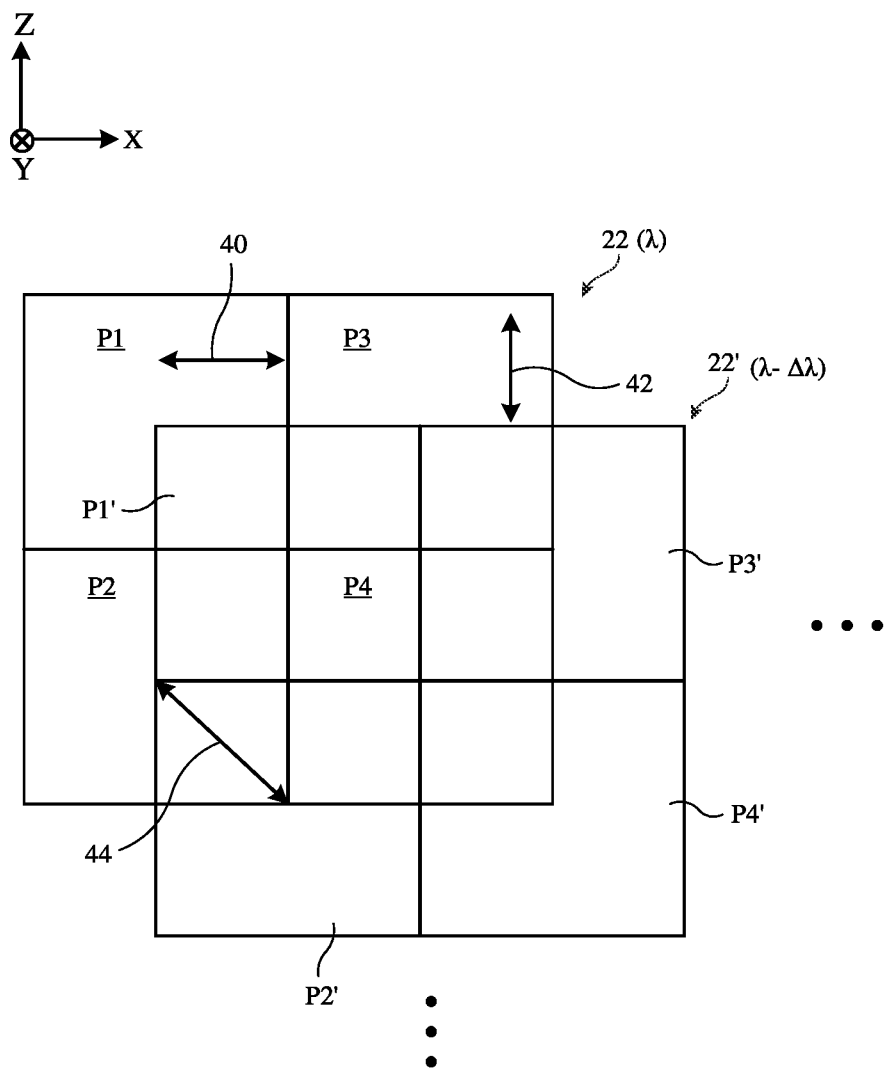
FIG. 3 is a front view of pixels of image light that illustrates how an illustrative optical system having wavelength-separating input coupling structures may increase the effective resolution of the image light in accordance with some embodiments.

FIG. 3 is a front view showing how light sources 34A and 34B and wavelength-separating input coupling structures 36 may provide images with an increased effective resolution at eye box 24 (e.g., as taken in the direction of arrow 25 of FIG. 2). In the example of FIG. 3, four pixels of image light of a single color (wavelength) are shown for the sake of clarity. In general, the image light and the display module may include any desired number of pixels of any desired number of colors/wavelengths.

As shown in FIG. 3, image light 22 may include pixels P1, P2, P3, and P4 of image data provided at a given wavelength from the first set of wavelengths λ (e.g., by first light sources 34A of FIG. 2). Wavelength-separating input coupling structures 36 may redirect image light 22 at the given wavelength from the first set of wavelengths λ, in a first direction (output angle), as image light 22'. In addition, image light 22 may include pixels P1', P2', P3', and P4' of image data provided at a given wavelength from the second set of wavelengths λ-Δλ (e.g., by second light sources 34B of FIG. 2). Wavelength-separating input coupling structures 36 may redirect image light 22 at the given wavelength from the second set of wavelengths λ-Δλ in a second direction (output angle), as image light 22". The second direction may be angularly offset from the first direction such that, at eye box 24, pixels P1, P2, P3, and P4 are respectively displaced from pixels P1', P2', P3', and P4' by (angular) displacement (offset) 44. Displacement 44 may, for example, be a two-dimensional displacement that includes offset 42 parallel to the Z-axis and/or offset 40 parallel to the X-axis.

Pixels P1, P2, P3, and P4 may exhibit a first pixel pitch and pixels P1', P2', P3', and P4' may exhibit the first pixel pitch. However, the combination of pixels P1, P2, P3, and P4 with pixels P1', P2', P3', and P4' may exhibit a second pixel pitch that is less than (e.g., half) the first pixel pitch. By rapidly toggling between providing image light 22' and image light 22" to eye box 24 (e.g., by rapidly toggling between first light sources 34A and second light sources 34B), the image light may effectively include each of pixels P1, P2, P3, P4, P1', P2', P3', and P4' (e.g., as perceived by a user at the eye box) and thus the second pixel pitch, rather than only pixels P1, P2, P3, and P4 and the first pixel pitch (e.g., in scenarios where wavelength-separating input coupling structures 36 are omitted). For example, first light sources 34A may be active to produce image light 22' during first time periods and second light sources 34B may be active to produce image light 22" during second time periods that are interleaved, interspersed, or alternating with the first time periods. This may serve to maximize the effective resolution of images in the image light without significantly increasing the size or power consumption of the display.

Figure 4:
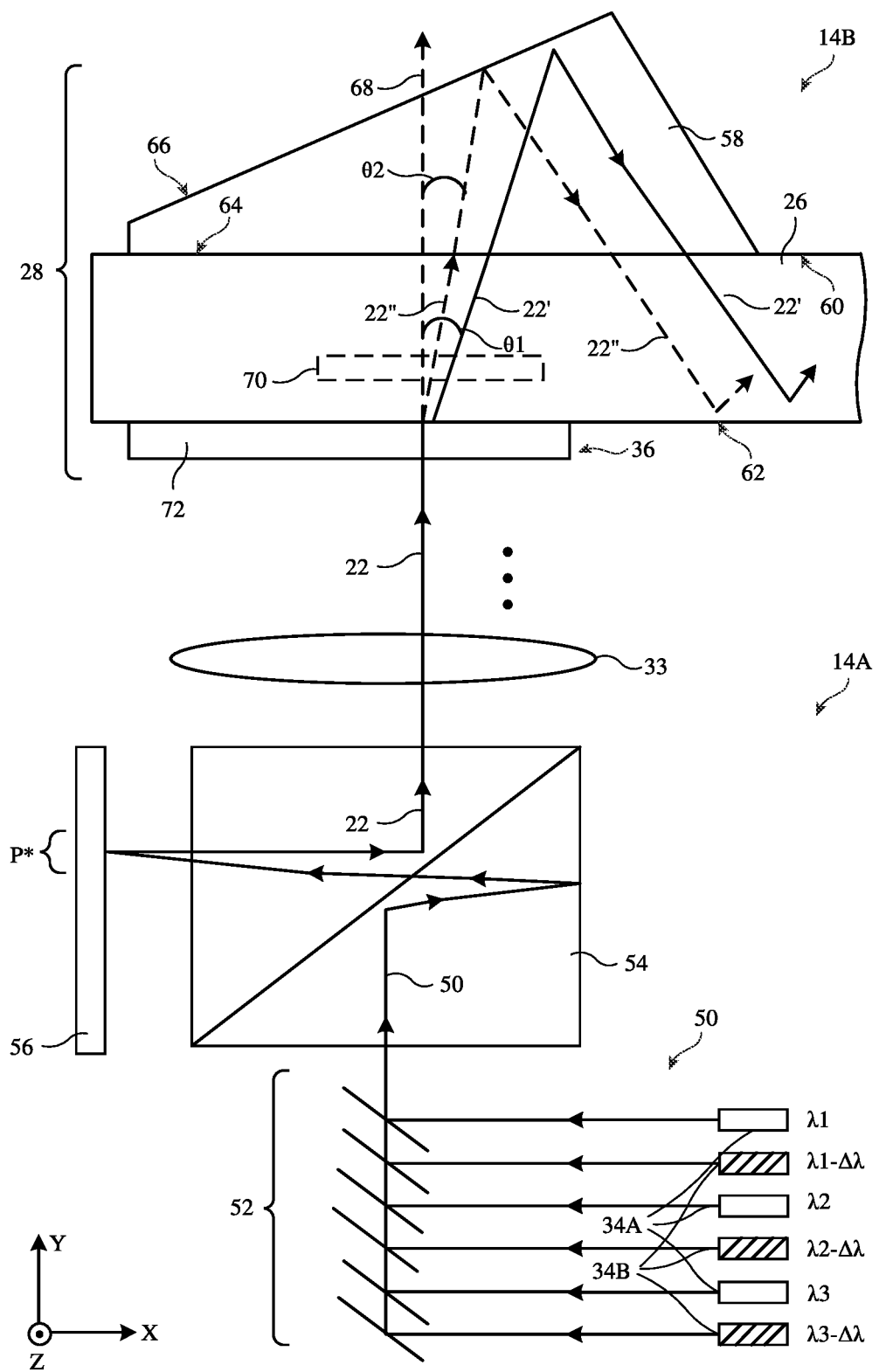
FIG. 4 is a top view of an illustrative optical system having a reflective input coupling prism and having wavelength-separating input coupling structures formed from transmissive diffraction grating structures in accordance with some embodiments.

Wavelength-separating input coupling structures 36 may include any desired optical structures that redirect different wavelengths of light incident at the same incident angle onto different respective output angles (e.g., output angles that are angularly separated by less than the angle subtended by the projection of one display module pixel). For example, wavelength-separating input coupling structures 36 may include diffractive grating structures. The diffractive grating structures may include transmissive diffraction gratings (e.g., transmission holograms) or reflective diffraction gratings (e.g., reflection holograms). FIG. 4 is a diagram showing how wavelength-separating input coupling structures 36 may include transmissive diffraction gratings.

As shown in FIG. 4, input coupler 28 may include a prism (e.g., a reflective input coupling prism) such as prism 58.

Prism 58 may have a bottom surface 64 mounted to exterior (lateral) surface 60 of waveguide 26 (e.g., using an optically clear adhesive not shown in FIG. 4 for the sake of clarity). Waveguide 26 may have an exterior (lateral) surface 62 that faces display module 14A.

In the example of FIG. 4, display module 14A is a reflective display module in which the light sources of the display module reflect illumination light off of a reflective spatial light modulator, such as reflective display panel 56, to produce image light 22. This is merely illustrative and, in general, display module 14A may be an emissive display module, a transmissive display module, or any other desired light projector that includes first light sources 34A and second light sources 34B.

Display module 14A may include first light sources 34A and second light sources 34B. First light sources 34A may be interspersed (interleaved) among second light sources 34B or may be grouped separately from second light sources 34B. First light sources 34A may emit illumination light 50 at the first set of wavelengths λ. The first set of wavelengths λ may include a first wavelength range λ1 (e.g., a range of red wavelengths or any other desired wavelength range or a single wavelength within that range), a second wavelength range λ3 (e.g., a range of green wavelengths or any other desired wavelength range or a single wavelength within that range), and a third wavelength range λ3 (e.g., a range of blue wavelengths or any other desired wavelength range or a single wavelength within that range). Second light sources 34B may emit illumination light 50 at the second set of wavelengths λ-Δλ. The second set of wavelengths λ-Δλ may include a fourth wavelength range λ1-Δλ (e.g., a range of red wavelengths or any other desired wavelength range or a single wavelength within that range), a fifth wavelength range λ2-Δλ (e.g., a range of green wavelengths or any other desired wavelength range or a single wavelength within that range), and a sixth wavelength range λ3-Δλ (e.g., a range of blue wavelengths or any other desired wavelength range or a single wavelength within that range). The fourth through sixth wavelength ranges may be offset from the first through third wavelength ranges, respectively, by the same wavelength offset Δλ or by different respective wavelength offsets.

Display module 14A may include prism 54. Optical structures 52 may redirect illumination light 50 from first light sources 34A and second light sources 34B towards prism 54. Optical structures 52 may include mirrors, partial mirrors, beam splitters, prisms, lenses, polarizers, or any other desired optical components. Display module 14A may include a reflective spatial light modulator such as reflective display panel 56. Display panel 56 may include a DMD panel, an LCOS panel, or any other desired reflective display panel. Prism 54 may direct illumination light 50 to display panel 56 (e.g., different pixels P* on display panel 56). Control circuitry 16 (FIG. 1) may control display panel 56 to selectively reflect illumination light 50 at each pixel location to produce image light 22 (e.g., image light having an image as modulated onto the illumination light by display panel 56). Prism 54 may direct image light 22 to collimating optics 33.

When first light sources 34A are active, illumination light 50 and thus image light 22 includes light of wavelengths ranges λ1, λ2, and λ3. When second light sources 34B are active, illumination light 50 and thus image light 22 includes light of wavelengths ranges λ1-Δλ, λ2,Δλ, and λ3-Δλ. Control circuitry 16 (FIG. 1) may rapidly alternate between activating first light sources 34A and second light sources 34B (e.g., to produce image light 22' and 22" of FIG. 3 having a maximal effective resolution at the eye box).

As shown in FIG. 4, wavelength-separating input coupling structures 36 may be layered onto surface 62 of waveguide 26. Wavelength-separating input coupling structures 36 may include transmissive diffraction grating structures such as at least one transmissive diffraction grating 72. The transmissive diffraction gratings 72 in structures 36 may include surface relief gratings, thin film holograms (e.g., thin film transmission holograms), volume holograms (e.g., transmission volume holograms), meta-gratings, or other transmissive diffraction gratings that diffract image light 22 incident in the +Y direction onto an output angle 0 that is less than 90 degrees with respect to the +Y direction (axis 68). Transmissive diffraction gratings 72 may each be formed in the same layer of grating medium, each transmissive diffraction grating may be formed in a respective layer of grating medium layered onto surface 62 of waveguide 26, or structures 36 may include multiple layers of grating medium that each include one or more transmissive diffraction gratings.

Transmissive diffraction gratings 72 may diffract image light 22 incident parallel to the Y-axis at wavelength ranges λ1, λ2, and λ3 onto output angle θ1 with respect to the Y-axis, as a beam of image light 22' (e.g., transmissive diffraction gratings 72 may include transmissive diffraction gratings that are Bragg-matched to image light 22 incident parallel to the Y-axis at wavelength ranges λ1, λ2, and λ3 such that the transmissive diffraction gratings diffract this image light onto output angle θ1 as image light 22'). In addition, transmissive diffraction gratings 72 may diffract image light 22 incident parallel to the Y-axis at wavelength ranges λ1-Δλ, λ2-Δλ, and λ3-Δλ onto output angle θ2, as a beam of image light 22" (e.g., transmissive diffraction gratings 72 may include transmissive diffraction gratings that are Bragg-matched to image light 22 incident parallel to the Y-axis at wavelength ranges λ1-Δλ, λ2-Δλ, and λ3-Δλ such that the transmissive diffraction gratings diffract this image light onto output angle θ2 as image light 22").

Output angle θ2 is different from (e.g., less than) output angle θ1. Image light 22' may pass through waveguide 26, surface 60, surface 64, and prism 58 to surface 66 of prism 58. Surface 66 (sometimes referred to herein as reflective surface 66) may be oriented non-parallel with respect to surface 60 of waveguide 26. Reflective surface 66 may reflect image light 22' at a first reflection angle back into waveguide 26. The first reflection angle may be an angle such that, upon passing back into waveguide 26, image light 22' continues to propagate down waveguide 26 via total internal reflection. Similarly, image light 22" may pass through waveguide 26, surface 60, surface 64, and prism 58 to reflective surface 66. Reflective surface 66 may reflect image light 22" at a second reflection angle back into waveguide 26. The second reflection angle may be an angle such that upon passing back into waveguide 26, image light 22" continues to propagate down waveguide 26 via total internal reflection, An optional reflective coating such as a metallic or dielectric coating may be layered over reflective surface 66 if desired.

Image light 22' may be angularly separated from image light 22" by separation angle θ1-θ2. Separation angle θ1-θ2 may be selected so that pixels P1-P4 of image light 22' are separated from pixels P1'-P4' of image light 22" by displacement 44 at eye box 24 (FIG. 3). In. order to support this angular separation, the grating pitch of transmissive diffraction gratings 72 may, for example, be selected to produce output angles θ1 and θ2 that satisfy the equation θ1-θ2 =φ/2, where φ is the angle subtended by the projection of one pixel P* of display panel 56. When first light sources 34A are active, transmissive diffraction gratings 72 provide image light 22' at output angle θ1 for the eye box. When second light sources 34B are active, transmissive diffraction gratings 72 provide image light 22" at output angle θ2 for the eye box. By alternating between providing image light 22' and 22" to the eye box. (e.g., at a rate faster than the response speed of the human eye, at greater than 24 Hz, at greater than 30 Hz, at greater than 60 Hz, at greater than 120 Hz, at greater than 240 Hz, etc.), image light 22' and 22" may collectively produce images at the eye box that have twice the effective resolution as would be present if only a single set of light sources were used and if structures 36 were omitted.

As one example, transmissive diffraction gratings 72 may include a single diffraction grating (e.g., a broadband grating such as a surface relief grating) that produces image light 22'and 22". As another example, transmissive diffraction gratings 72 may include a first hologram (e.g., volume hologram) that diffracts image light 22 at wavelength ranges λ1 (as image light 22') and λ1-Δλ (as image light 22"), a second hologram (e.g., volume hologram) that diffracts image light 22 at wavelength ranges λ2 (as image light 22') and λ2-Δλ (as image light 22"), and a third hologram (e.g., volume hologram) that diffracts image light 22 at wavelength ranges λ3 (as image light 22') and λ3-Δλ (as image light 22"). The first, second, and third holograms may be recorded in respective layers of grating medium or two or more of the holograms may share a single layer of grating medium (e.g., two or more of the holograms may be multiplexed or superimposed within the same volume of grating medium). As yet another example, transmissive diffraction gratings 72 may include a first hologram (e.g., volume hologram) that diffracts image light 22 at wavelength range λ1 (as image light 22'), a second hologram (e.g., volume hologram) that diffracts image light 22 at wavelength range and λ1- Δλ (as image light 22"), a third hologram (e.g., volume hologram) that diffracts image light 22 at wavelength range λ2 (as image light 22'), a fourth hologram (e.g., volume hologram) that diffracts image light 22 at wavelength range and λ2-Δλ (as image light 22"), a fifth hologram (e.g., volume hologram) that diffracts image light 22 at wavelength range λ3 (as image light 22'), and a sixth hologram (e.g., volume hologram) that diffracts image light 22 at wavelength range and λ3-Δλ (as image light 22"). Each of these holograms may be recorded in respective layers of grating medium or two or more of the holograms may share a single layer of grating medium (e.g., two or more of the holograms may be multiplexed or superimposed within the same volume of grating medium). If desired, the dispersive properties of the holograms may provide some or all of the angular separation between image light 22' and 22" in some or all of these scenarios.

The example of FIG. 4 is merely illustrative. In general, first and second light sources 34A may each include two light sources, one light source, or more than three light sources (e.g., for providing image light 22 within any desired number of color bands). Infrared, near-infrared, and/or ultraviolet light sources may be used. If desired, more than two sets of light sources may be used (e.g., three sets, four sets, more than four sets, etc.). In these scenarios, wavelength-separating input coupling structures 36 may divide image light 22 into a number of beams within waveguide 26 equal to the number of sets of light sources. Display module 14A need not be a reflective display module. Transmissive diffraction gratings 72 of wavelength-separating input coupling structures 36 may be layered between prism 58 and surface 60 of waveguide 26 or may be embedded within waveguide 26 (e.g., at location 70). In scenarios where transmissive diffraction gratings 72 are formed at location 70, the transmissive diffraction gratings may be recorded in one or more layers of grating media layered onto a transparent waveguide substrate or embedded between two layers of transparent waveguide substrate. One or more of the layers of grating media used to form transmissive diffraction gratings 72 may also be used to record holograms in cross-coupler 32 and/or output coupler 30 of FIG. 2, if desired.

Figure 5:
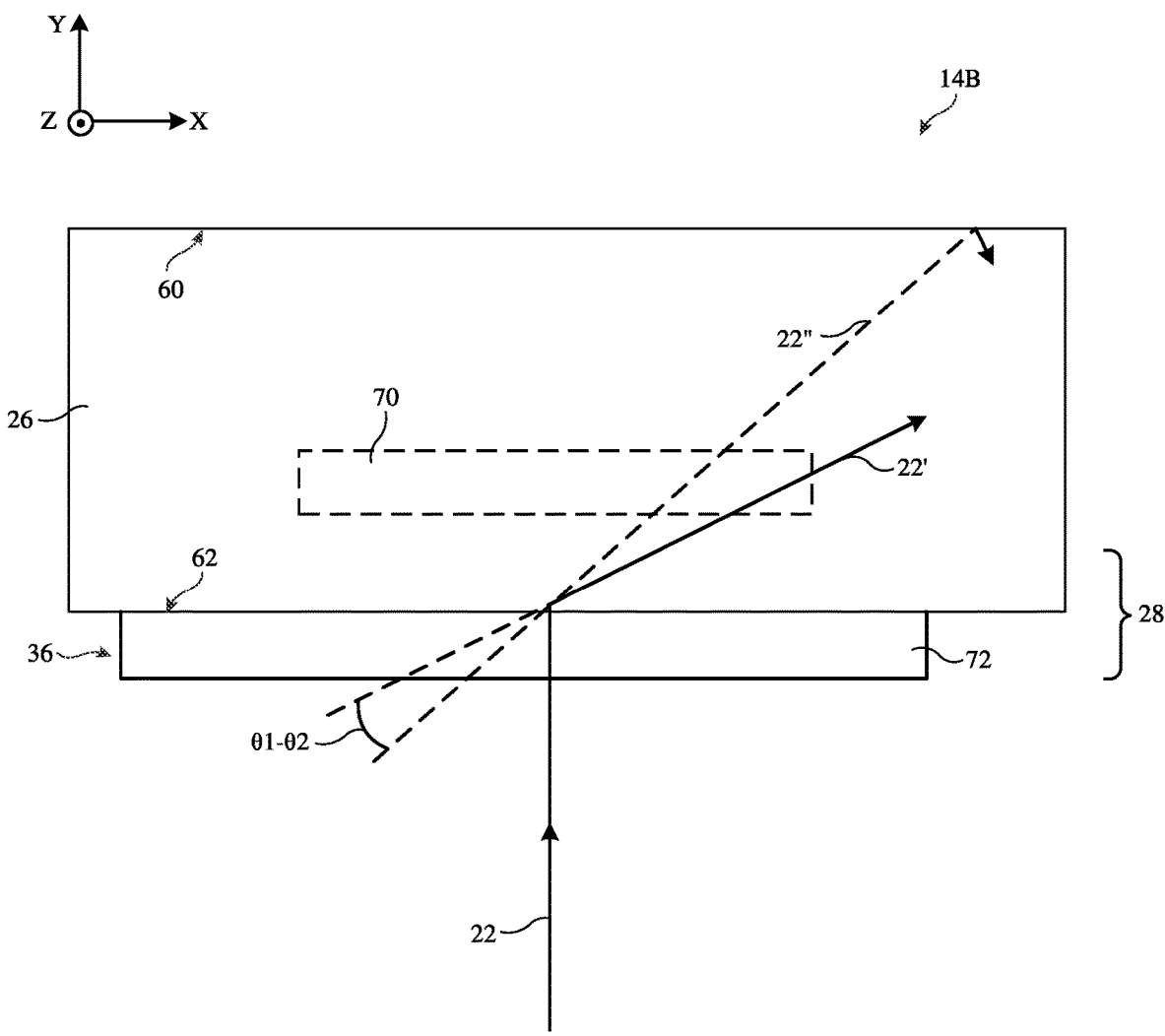
FIG. 5 is a top view of an illustrative optical system having wavelength-separating input coupling structures formed from transmissive diffraction grating structures that couple light into a waveguide without an input coupling prism in accordance with some embodiments.

The example of FIG. 4 in which input coupler 28 includes prism 58 is merely illustrative. In another suitable arrangement, prism 58 may be omitted. FIG. 5 is a diagram of optical system 14B in an example where prism 58 is omitted. As shown in FIG. 5, transmissive diffraction gratings 72 may diffract image light 22 to produce a beam of image light 22' and a beam of image light 22" that are separated by separation angle θ1-θ2. The output angles of image light 22" and image light 22' from transmissive diffraction gratings 72 may be such that image light 22" and image light 22' propagate down the length of waveguide 26 via total internal reflection (e.g., wavelength-separating input coupling structures 36 may couple the image light into waveguide 26 as an input coupler). The example of FIG. 5 is merely illustrative. If desired, transmissive diffraction gratings 72 of FIG. 5 may be embedded within waveguide 26 (e.g., at location 70).

Figure 6:
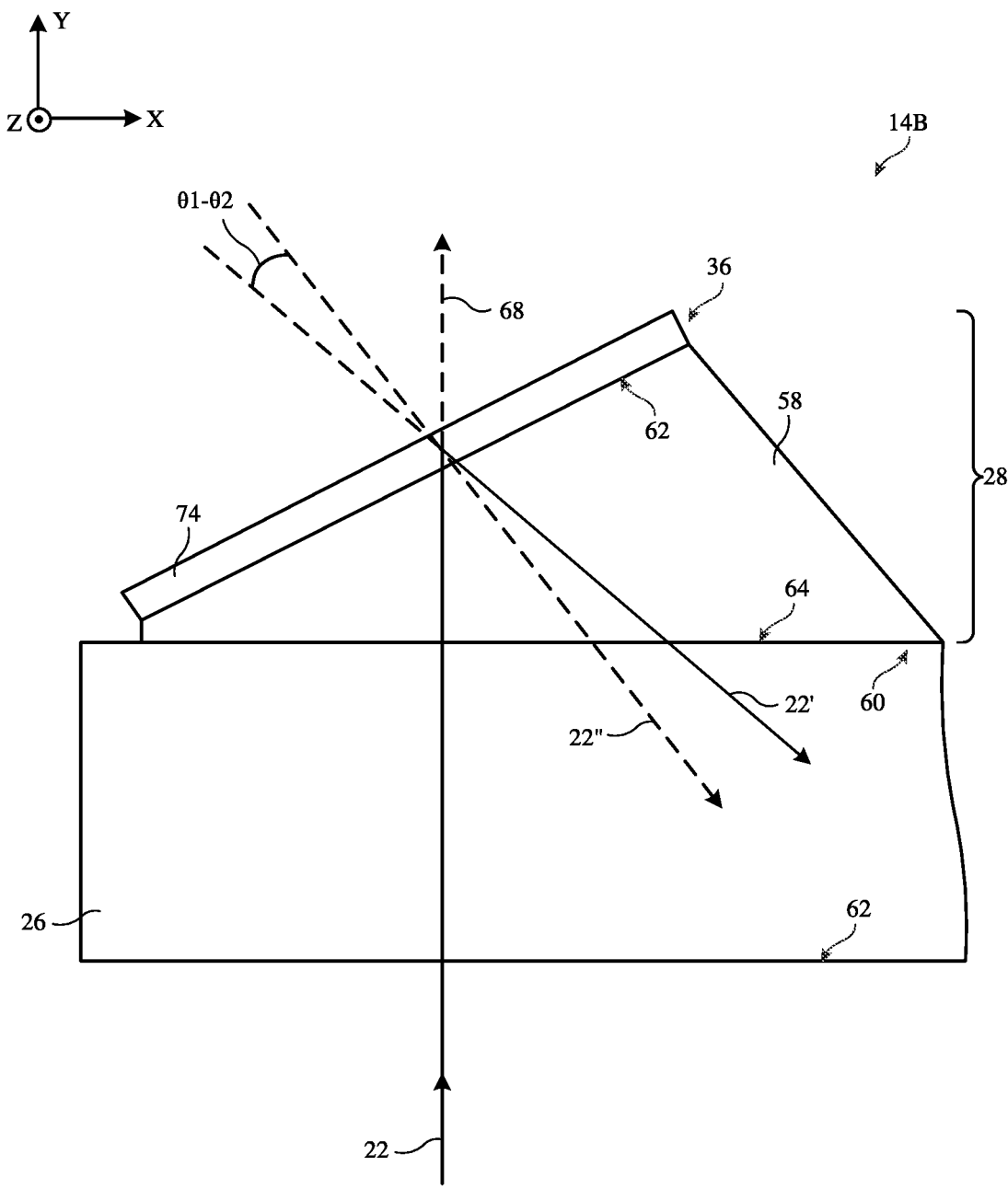
FIG. 6 is a top view of an illustrative optical system having a reflective input coupling prism and having wavelength-separating input coupling structures formed from reflective diffraction grating structures on the prism in accordance with some embodiments.

The examples of FIGS. 4 and 5 in which wavelength-separating input coupling structures 36 include transmissive diffraction gratings is merely illustrative. In another suitable arrangement, wavelength-separating input coupling structures 36 may include reflective diffraction gratings. FIG. 6 is a diagram showing how wavelength-separating input coupling structures 36 may include reflective diffraction gratings.

As shown in FIG. 6, wavelength-separating input coupling structures 36 may include reflective diffraction gratings 74 layered onto reflective surface 66 of prism 58. Reflective diffraction gratings 74 may perform similar operations on incident image light 22 as described above in connection with transmissive diffraction gratings 72 of FIGS. 4 and 5, but where the output angles of the image light diffracted by wavelength-separating input coupling structures 36 are greater than 90 degrees with respect to the +Y direction (axis 68). Thus, as shown in FIG. 6, reflective diffraction gratings 74 may separate image light 22 into a beam of image light 22' and a beam of image light 22" that is separated from the beam of image light 22' by separation angle θ1θ2. Image light 22' and 22" may then propagate down the length of waveguide 26 via total internal reflection. Reflective diffraction gratings 74 may include one, three, six, or any other desired number of reflective diffraction gratings (e.g., surface relief gratings, volume holograms, etc.) within a single layer of grating medium or distributed across two or more layers of grating medium layered over reflective surface 66 (e.g., similar to as described above in connection with transmissive diffraction gratings 72). In another suitable arrangement, prism 58 may be omitted. and reflective diffraction gratings 74 may be layered directly onto surface 60 of waveguide 26.

Figure 7:
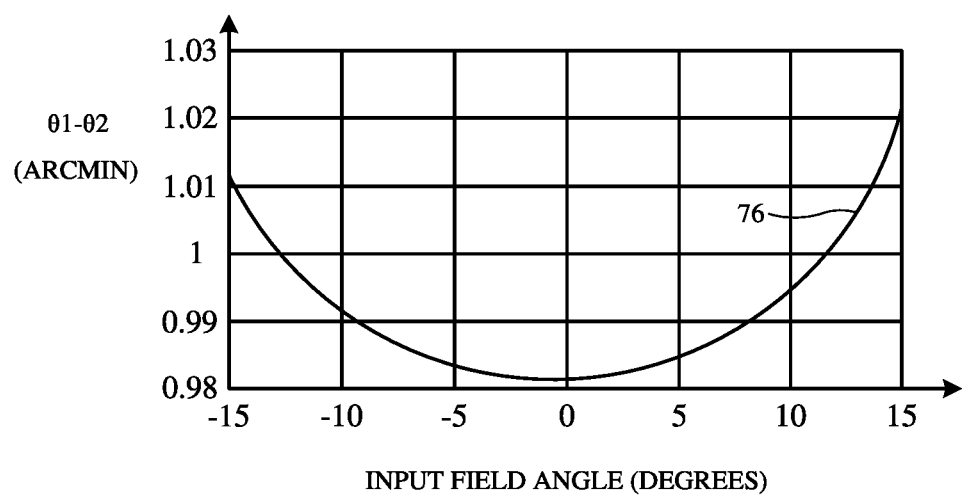
FIG. 7 is an illustrative field angle sensitivity plot for diffraction grating structures of the types shown in FIGS. 4-6 in accordance with some embodiments.

FIG. 7 is an illustrative field angle sensitivity plot for diffraction gratings in wavelength-separating input coupling structures 36 (e.g., transmissive diffraction gratings 72 of FIGS. 4 and 5 or reflective diffraction gratings 74 of FIG. 6). The horizontal axis of FIG. 7 plots input field angle for the light in degrees. The vertical axis of FIG. 7 plots the separation angle θ1-θ2 produced by the diffraction gratings in arcmin. As shown by curve 76, separation angle θ1-θ2 may reach a minimum between approximately −5 and 5 degrees. Curve 76 shows an example where wavelength offset Δλ is 10 nm and the grating pitch of the diffraction gratings is 35 microns. This is merely illustrative. In general, any desired wavelength offset and/or any desired grating pitch may be used. Curve 76 may have other shapes.

Figure 8:
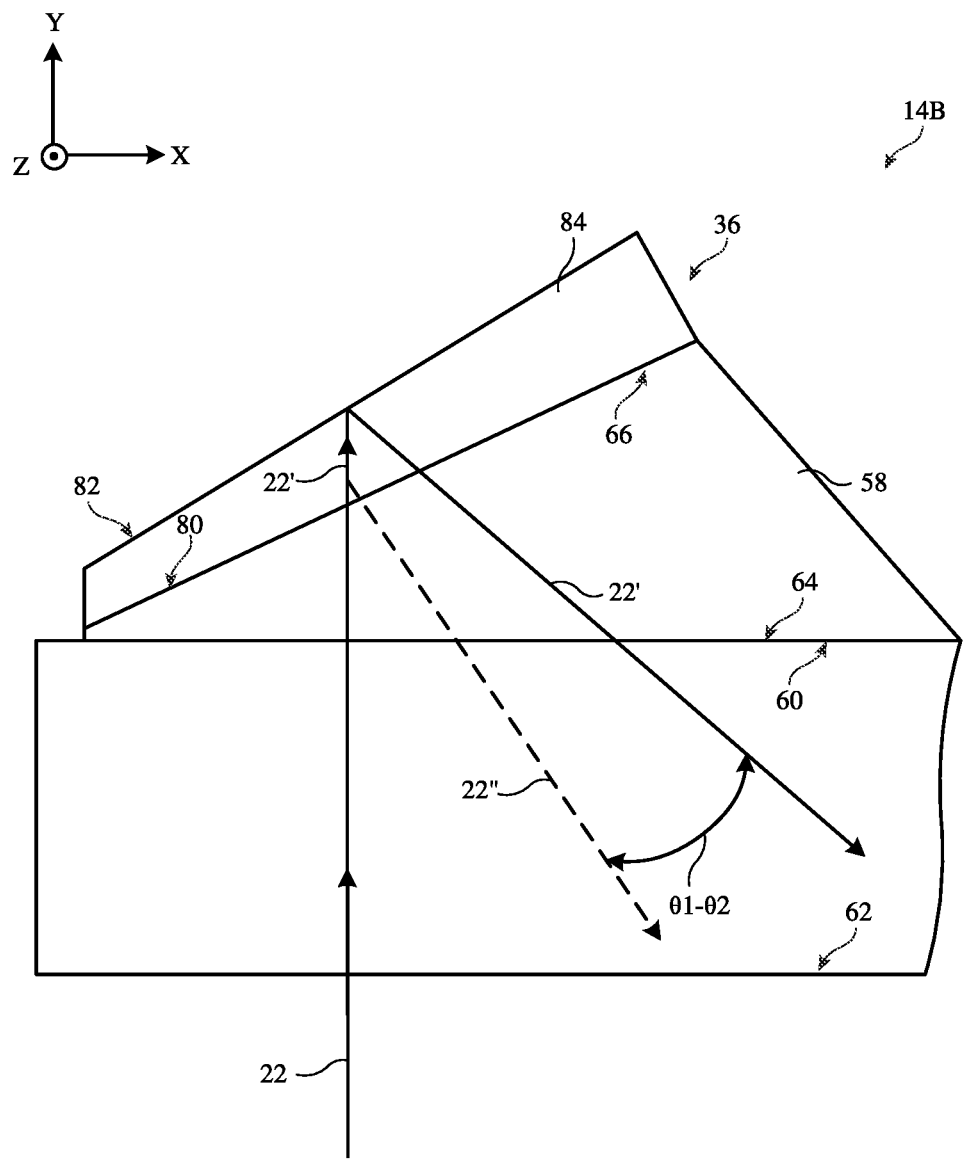
FIG. 8 is a top view of an illustrative optical system having a reflective input coupling prism and having wavelength-separating input coupling structures formed from a dichroic wedge on the prism in accordance with some embodiments.

The examples of FIGS. 4-6 in which wavelength-separating input coupling structures 36 include diffraction gratings is merely illustrative. In another suitable arrangement, wavelength-separating input coupling structures 36 may include a dichroic filter. FIG. 8 is a diagram showing how wavelength-separating input coupling structures 36 may include a dichroic filter such as dichroic wedge 84.

As shown in FIG. 8, dichroic wedge 84 may have a first surface 80 mounted to reflective surface 66 of prism 58. Dichroic wedge 84 may have a second surface 82 opposite first surface 80. Second surface 82 may be oriented at a non-parallel angle with respect to first surface 80. First surface 80 may be provided with a coating or a set of coatings (e.g., at least one coating layered onto surface 80 or reflective surface 66 or otherwise interposed between surface 80 and reflective surface 66). The coating(s) may be configured to transmit light in wavelength ranges λ1, λ2 and λ3 as a beam of image light 22'. At the same time, the coating(s) may be configured to reflect light in wavelength ranges λ1-Δλ, λ2-Δλ, and λ3-Δλ as a beam of image light 22". Image light 22' may reflect off of surface 82 and back into waveguide 26. Surfaces 82 and 80 may be oriented such that the image light 22' reflected off of surface 82 is separated from the image light 22" reflected off of surface 80 by separation angle θ1-θ2. If desired, an optional reflective coating may be provided on surface 82.

The foregoing is merely illustrative and various modifications can be made to the described embodiments. The foregoing embodiments may be implemented individually or in any combination.

What is claimed is:

1. A display system configured to provide images to an eye box, the display system comprising:
   a display module configured to generate a beam of image light at a first wavelength during first time periods and at a second wavelength that is different from the first wavelength during second time periods that alternate with the first time periods;
   a waveguide;
   a wavelength-separating input coupling structure configured to:
      redirect into the waveguide, as first image light, light of the first wavelength from the beam of image light, wherein the first image light is redirected into the waveguide at a first angle, and
      redirect into the waveguide, as second image light, light of the second wavelength from the beam of image light, wherein the second image light is redirected into the waveguide at a second angle that is separated from the first angle by a non-zero separation angle and wherein the waveguide is configured to propagate the first and second image light via total internal reflection; and
   an output coupler configured to couple the first and second image light out of the waveguide and towards the eye box.

2. The display system of claim 1, wherein the second wavelength is within 20 nm of the first wavelength.

3. The display system of claim 1, wherein the display module comprises:
   a first light source configured to produce the beam of image light at the first wavelength, wherein the first light source is on during the first time periods and off during the second time periods; and
   a second light source configured to produce the beam of image light at the second wavelength, wherein the second light source is on during the second time periods and off during the first time periods.

4. The display system of claim 3, wherein the display module further comprises:
   a reflective display panel, wherein the first light source is configured to provide illumination light of the first wavelength to the reflective display panel during the first time periods and wherein the second light source is configured to provide illumination light of the second wavelength to the reflective display panel during the second time periods.

5. The display system of claim 4, wherein the reflective display panel comprises a display panel selected from the group consisting of: a liquid crystal on silicon (LCOS) display panel and a digital-micromirror device (DMD) display panel.

6. The display system of claim 4, wherein the reflective display panel comprises a plurality of pixels and wherein the separation angle is equal to one-half an angle subtended by a projection of one pixel in the plurality of pixels.

7. The display system of claim 1, wherein the wavelength-separating input coupling structure comprises diffractive grating structures configured to diffract, onto the first angle, the light of the first wavelength from the beam of image light, and wherein the diffractive grating structures are configured to diffract, onto the second angle, the light of the second wavelength from the beam of image light.

8. The display system of claim 7, wherein the diffractive grating structures comprise transmissive diffraction grating structures.

9. The display system of claim 8, wherein the transmissive diffraction grating structures are embedded within the waveguide.

10. The display system of claim 8, wherein the waveguide has a first lateral surface facing the display module and a second lateral surface opposite the first lateral surface and wherein the transmissive diffraction grating structures are layered on the first lateral surface of the waveguide.

11. The display system of claim 10, further comprising:
    a reflective input coupling prism mounted to the second lateral surface of the waveguide, wherein the reflective input coupling prism is configured to reflect the first and second image light into the waveguide.

12. The display system of claim 8, wherein the transmissive diffraction grating structures comprise a structure selected from the group consisting of: a surface relief grating, a set of volume holograms, and a set of thin-film holograms.

13. The display system of claim 7, wherein the diffractive grating structures comprise reflective diffraction grating structures.

14. The display system of claim 13, wherein the waveguide has a first lateral surface facing the display module and a second lateral surface opposite the first lateral surface, the display system further comprising:
    a reflective input coupling prism mounted to the second lateral surface of the waveguide, wherein the reflective input coupling prism has a surface oriented at a non-parallel angle with respect to the second lateral surface and wherein the reflective diffraction grating structures are layered on the surface of the prism.

15. The display system of claim 14, wherein the reflective diffraction grating structures comprise a structure selected from the group consisting of: a surface relief grating, a set of volume holograms, and a set of thin-film holograms.

16. The display system of claim 1, wherein the waveguide has a first lateral surface facing the display module and a second lateral surface opposite the first lateral surface, the display system further comprising:
   a reflective input coupling prism mounted to the second lateral surface of the waveguide, wherein the reflective input coupling prism has a surface oriented at a non-parallel angle with respect to the second lateral surface; and
   a dichroic wedge having a first surface mounted to the surface of the prism and having a second surface opposite the first surface, wherein the second surface is oriented at a non-parallel angle with respect to the first surface, wherein the first surface is configured to transmit the first image light, wherein the first surface is configured to reflect the second image light into the waveguide, and wherein the second surface is configured to reflect the first image light into the waveguide.

17. A display system configured to display images at an eye box, the display system comprising:
   first light sources configured to generate illumination light of a first set of wavelengths during first time periods;
   second light sources configured to generate illumination light of a second set of wavelengths that is offset from the first set of wavelengths during second time periods, wherein the second time periods are interleaved with the first time periods;
   a reflective display panel configured to produce first image light by reflecting the first illumination light and configured to produce second image light by reflecting the second illumination light;
   a waveguide having a lateral surface;
   at least one transmissive diffraction grating layered on the lateral surface of the waveguide, wherein the at least one transmissive diffraction grating is configured to:
      receive the first image light at an incident angle during the first time periods;
      receive the second image light at the incident angle during the second time periods;
      diffract the first image light into the waveguide at a first output angle, and
      diffract the second image light into the waveguide at a second output angle that is separated from the first output angle by a non-zero separation angle, wherein the waveguide is configured to propagate the first and second image light via total internal reflection; and
   an output coupler configured to couple the first and second image light out of the waveguide and towards the eye box.

18. The display system of claim 17, wherein the waveguide has an additional lateral surface opposite the lateral surface and wherein the display system further comprises:
   a reflective input coupling prism mounted to the additional lateral surface, wherein the reflective input coupling prism has a reflective surface that is configured to receive the first and second image light diffracted by the at least one transmissive diffraction grating and that is configured to reflect the first and second image light into the waveguide.

19. The display system of claim 17, wherein the at least one transmissive diffraction grating comprises a structure selected from the group consisting of: a surface relief grating, a set of volume holograms, and a set of thin-film holograms.

20. The display system of claim 17, wherein the second set of wavelengths is offset from the first set of wavelengths by less than or equal to 20 nm.

21. A display system configured to display images at an eye box, the display system comprising:
   first light sources configured to generate illumination light of a first set of wavelengths during first time periods;
   second light sources configured to generate illumination light of a second set of wavelengths that is offset from the first set of wavelengths during second time periods, wherein the second time periods are interleaved with the first time periods;
   a reflective display panel configured to produce first image light by reflecting the first illumination light and configured to produce second image light by reflecting the second illumination light;
   a waveguide having a lateral surface;
   a prism mounted to the lateral surface of the waveguide, wherein the prism has a reflective surface oriented at a non-parallel angle with respect to the lateral surface of the waveguide; and
   a wedge having a first surface mounted to the reflective surface of the prism and having a second surface opposite the first surface, wherein the second surface is oriented at a non-parallel angle with respect to the first surface, wherein at least one coating is interposed between the reflective surface and the first surface, wherein the at least one coating is configured to transmit the first image light, wherein the second surface is configured to reflect the first image light into the waveguide at a first angle, and wherein the at least one coating is configured to reflect the second image light into the waveguide at a second angle that is separated from the first angle by a non-zero separation distance.

22. The display system of claim 21, wherein the waveguide is configured to propagate the first and second image light via total internal reflection and wherein the display system further comprises:
   an output coupler configured to couple the first and second image light out of the waveguide and towards the eye box.

23. The display system of claim 21, wherein the second set of wavelengths is offset from the first set of wavelengths by less than or equal to 20 nm.

* * * * *